United States Patent [19]

Miettinen et al.

[11] Patent Number: 4,518,550
[45] Date of Patent: May 21, 1985

[54] METHOD OF MANUFACTURING RIGID FRAME BUILDING ELEMENTS FILLED WITH HARD FOAM PLASTIC

[75] Inventors: Jorma K. Miettinen; Eero J. Virtanen, both of Kankaanpää, Finland

[73] Assignee: Makrotalo Oy, Kankaanpää, Finland

[21] Appl. No.: 494,895

[22] Filed: May 16, 1983

[51] Int. Cl.³ .................. B29D 27/04; B30B 1/32
[52] U.S. Cl. .................. 264/46.5; 100/269 A; 264/45.2; 264/46.6; 425/110; 425/123; 425/366; 425/367; 425/817 R
[58] Field of Search .................. 264/46.2, 46.5, 46.6, 264/45.2; 425/110, 366, 367, 817 R, 123; 100/269 A, 269 R, 192, 191, 169

[56] References Cited

U.S. PATENT DOCUMENTS

| 2,598,190 | 5/1952 | Offutt | 100/269 A X |
|---|---|---|---|
| 2,830,631 | 4/1958 | Cranston, Jr. et al. | 100/269 A X |
| 3,167,603 | 1/1965 | Lillie | 264/46.2 |
| 3,369,065 | 2/1968 | Keith | 264/46.2 |
| 3,444,029 | 5/1969 | Renaud et al. | 100/269 A X |
| 3,771,438 | 11/1973 | Radakovich | 100/269 A X |
| 4,258,766 | 3/1981 | van Dijk | 100/269 A X |
| 4,351,233 | 9/1982 | Leonard | 100/269 A X |

FOREIGN PATENT DOCUMENTS

| 29980 | 5/1884 | Fed. Rep. of Germany . | |
|---|---|---|---|
| 53-14767 | 2/1978 | Japan | 264/46.2 |
| 55-41261 | 3/1980 | Japan | 264/46.2 |
| 57-74130 | 5/1982 | Japan | 264/46.2 |
| 77218 | 7/1950 | Norway . | |
| 84734 | 8/1933 | Sweden . | |
| 348672 | 9/1972 | Sweden . | |

Primary Examiner—Philip Anderson
Attorney, Agent, or Firm—Bernard, Rothwell & Brown

[57] ABSTRACT

A method of manufacturing rigid frame building elements filled with hard foam plastic, said method comprising the use of prefabricated, rigid, dimensionally stable, hollow skeleton frames, the hollow interior spaces of said skeleton frames are foamed and filled with closed cell hard foam plastic serving as heat insulation, and the elements are subjected in a press to compression pressure which overrules the foaming pressured exerted on the frame of an element from inside. For continuous-action manufacture, the used press is a (known as such on the basis of size presses) continuous-action press machine whose lower frame is equipped with lower conveyor means (4) and upper frame with upper conveyor means (5), said conveyor means confining between themselves a conveying gap, in which the passing elements are maintained subjected to compression pressure by means of pressure members (7) carried by said conveyor means. The conveying gap, defined by said conveyor means and limited on at least one side by a horizontal tangential plane of parallel-disposed, crosswise of the machine extending rolls (5a), is set to be smaller than prefabricated skeleton frames. The prefabricated skeleton frames are fed into the conveying gap which due to the action of elements passing in said gap expands in a manner that each roll (5a) is capable of moving vertically against the force exerted by pressure members (7). Conveying speed is adjusted in view of the length of said conveying gap in a manner that expansion of a filling foam and the pressure generated thereby has substantially ceased by the time an element leaves the conveying gap.

4 Claims, 4 Drawing Figures

METHOD OF MANUFACTURING RIGID FRAME BUILDING ELEMENTS FILLED WITH HARD FOAM PLASTIC

The present invention relates to a method of manufacturing rigid frame building elements filled with hard foam plastic, said method comprising the use of prefabricated, rigid, dimensionally stable, hollow skeleton frames, the hollow interior spaces of said skeleton frames are foamed and filled with closed cell hard foam plastic serving as heat insulation, and the elements are subjected in a press to a compression pressure which exceeds the foaming pressure exerted on the frame of an element from inside.

Heretofore, rigid frame building elements have been manufactured in a manner that e.g. prefabricated wooden skeleton frames have been laid on top of each other between the press platens of a single-action press. When the elements lie in the press subjected to compression pressure, the hollow interior spaces thereof are foamed full of closed cell hard foam plastic, such as polyurethane foam, serving as heat insulation. The reaction time required by such foaming process induces a certain delay period. The manufacturing capacity is limited by the filling degree of a press. The preheating of elements to the optimum foaming temperature is difficult or impossible to arrange. If one element in the press is damaged, the rest of the elements shall not acquire sufficient compression pressure either and, hence, the entire stack of elements in the press will be wasted.

These are some of the reasons why possibilities have been studied to manufacture rigid frame building elements in a continuous-action press machine. The problem to be overcome here will be that a uniform compression pressure should be applied to an element continuously travelling through the machine despite the fact that the dimensions of a prefabricated element frame may vary at various spots of elements and, also, the dimensions of successive elements with respect to each other may vary. Dimensional variations result from manufacturing tolerances, moisture-induced living of wood materials and the like factors.

The problem can be solved by a continuous-action method of the invention which is characterized in that employed as a press for continuous-action manufacture is (known as such on the basis of size presses) a continuous-action press machine whose lower frame is equipped with lower conveyor means (4) and upper frame with upper conveyor means (5), said conveyor means confining between themselves a conveying gap, in which the moving elements are maintained subjected to compression pressure by means of pressure members (7) carried by said conveyor means, that the conveying gap, confined by the conveyor means and limited on at least one side by a horizontal tangential plane of parallel-disposed, crosswise of the machine extending rolls (5a), is set to be smaller than prefabricated skeleton frames, that said prefabricated skeleton frames are fed into the conveying gap which expands due to the action of elements travelling in said conveying gap in a manner that each roll (5a) is separately capable of moving vertically against the force exerted by pressure members (7), and that conveying speed is so adapted in view of the length of said conveying gap that the expansion of filling foam and the pressure exerted thereby are substantially ceased by the time an element leaves said conveying gap.

In this arrangement of the invention, an element itself determines the size of a conveying gap, which size can locally vary from one roll to another. This way it is ensured that every spot of an element is subjected to sufficient compression pressure, so that the pressure generated inside said element during the foaming of heat insulation won't shatter the skeleton frame of an element. There will be no problems even when dimensional variations occur between successive elements.

A machine for carrying out a method of the invention can also be used in connection with the manufacture of rigid frame building elements as a size press for securing the internal and external lining plates of elements to the beams making up the frame of an element. Also in this case, despite the dimensional variations, all sizing seams are subjected to effective compression pressure while an element is continuously travelling through the machine.

Due to the above-mentioned dimensional variations, between plane surface conveyor means the compression would only be applied to certain parts of an element while other parts would be left without compression, so the plane surface conveyor means cannot at all be applied to the continuous-action manufacturing of rigid frame building elements.

Another advantage of the invention is that temporary storage of elements is not needed, which is the case when using single-action presses. In addition, the method of the invention permits development of the foaming technique e.g. by means of preheating the elements. A heated element allows the use of a cheaper quality foam and makes a lower degree of filling possible, resulting in considerable savings in the consumption of a foaming agent. Savings are also achieved in element frame materials as the frame need not be sturdy as required when using a single-action press. If an element is shattered, the rest of the elements shall not be damaged. Handling of elements can be managed with less personnel than required when using single-action presses.

A preferred embodiment of the invention will now be described with reference to the accompanying drawings, in which.

Figure 1:
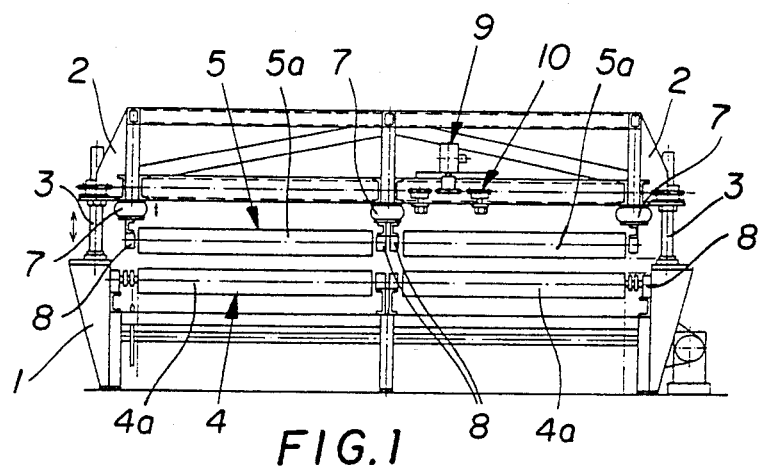
FIG. 1 is a front view of a machine used for carrying out a method of the invention.
Figure 2:
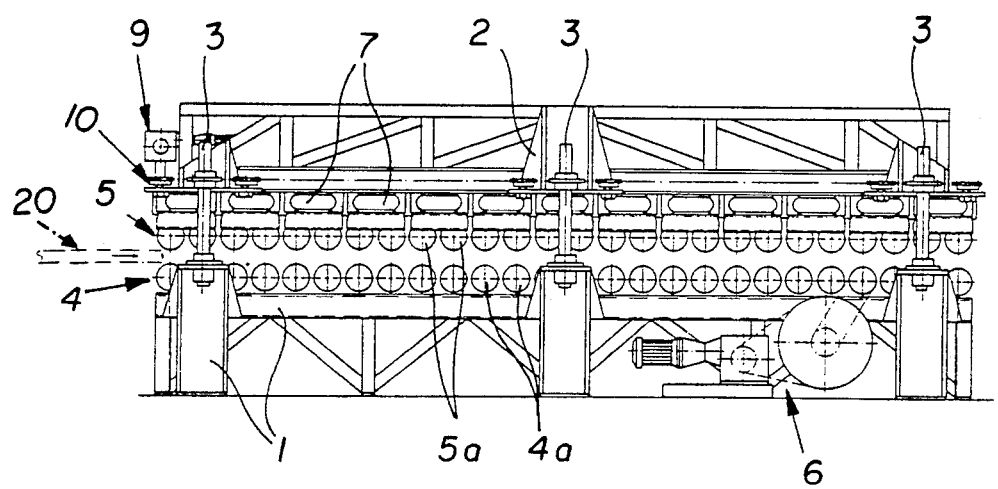
FIG. 2 illustrates the same in side view.
Figure 3:
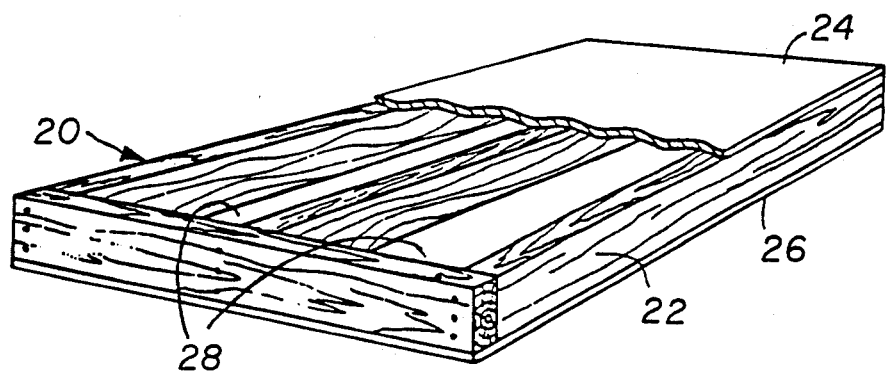
FIG. 3 shows an example of the construction of an element to be manufactured.
Figure 4:
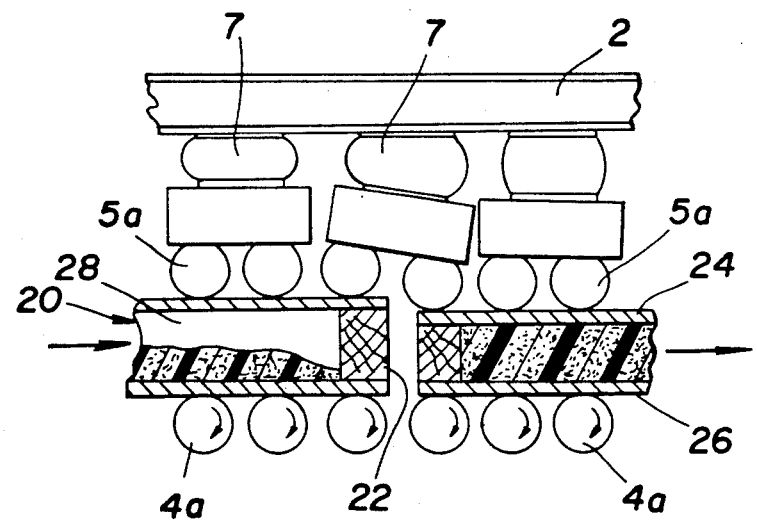
FIG. 4 is a front cross-sectional view of a broken away portion illustrating movement of the frame in conveying means of the machine of FIG. 1.

The machine comprises a lower frame 1 and an upper frame 2, joined together by means of screws 3 on the sides of the machine. The vertical distance between frames 1 and 2 is adjustable by using a drive means 9 and a chain drive 10 to turn the nut members mounted on screws 3.

The lower frame 1 is equipped with lower conveyor means 4, comprising rolls 4a that are journalled for rotation in their fixed positions. For conveying the elements 20, said rolls 4a are adapted to be rotated by a drive means 6 through a chain or belt transmission.

The upper frame is equipped with upper conveyor means 5, comprising rolls 5a whose end bearings 8 are accompanied by pneumatic bellows 7. Bearings 8 are suspended from frame 2 by means of a bolt suspension, not shown, in a manner that they are individually capable of moving upwards against the force of pneumatic bellows 7. With a prestress, which is substantially of the same order as the desired compression, said pneumatic bellows 7 hold rolls 5a in a position in which the conveying and compression gap or nip between the upper and lower frames is smaller than the smallest vertical dimension of elements coming therebetween (tolerance variations considered).

By means of the described machine, the method is carried out as follows. Rigid frame building elements having wood frames 22 enclosed by upper and lower surface lining plates 24 and 26 are successively fed into the conveying and compression gap of the machine. An insulating foam agent has just been charged into an element, and such element must be delivered into the spaces 28 in the compression gap or nip before the pressure generated by the foam expansion starts taking effect inside the element. The elements lift each roll 5a upwards, meaning that at each roll there prevails a substantially equal and in any case a sufficient compression despite dimensional differences of the elements at various spots of an element or despite the dimensional differences between successive elements. Ensured this way is that at each glue seam in the elements there prevails a sufficient compression through the entire pressing operation, or that the surface lining plates of an element are on all sides pressed with a sufficient pressure against the skeleton frame beams in a manner that the friction between plates and beams is sufficient to resist the internal pressure generated by insulator foaming.

When the machine is used for manufacturing sets of elements having different nominal dimensions, the distance between rolls 4a and 5a is adjusted by means of screws 3 so as to fit each series to be manufactured.

Although the elements only come to line contact with each roll, the surface lining plates of elements are generally sufficiently stiff, so that no plate bendings occur between the rolls due to the internal foaming pressure. If necessary, it is of course possible to use loose reinforcement plates on the top and bottom surfaces of said elements, whereby the conveying nip must be smaller than the vertical thickness of an element provided with such reinforcement plates.

We claim:

1. A method of manufacturing rigid frame building elements filled with hard foam plastic wherein the building elements have wooden frames covered by plates on opposite sides forming enclosed hollow interior spaces, the method comprising the steps of:

charging a quantity of delayed foaming plastic material into the enclosed hollow interior spaces of the building elements, delivering the charged building elements into a conveying and compression gap between upper and lower roller conveyors before the foaming plastic material expands to produce pressure within the interior spaces, driving the rollers of the lower conveyor to advance the building elements along a conveying path through the conveying and compression gap, engaging the plates covering the building elements with a plurality of rollers of each of the respective upper and lower roller conveyors throughout advancing of the building elements along the conveying path, said engaging with the upper and lower pluralities of rollers being at lines transverse to the conveying path and extending substantially across the width of the surfaces of the plates wherein the lines are closely spaced along the conveying path so that said engaging resists bending of the plates between the lines due to pressure of the foaming material, maintaining said engaging step in the conveying and compression gap for a duration greater than the duration required for the expansion of the foaming plastic material and the cessation of the pressure exerted thereby, compressing the rollers of the upper conveyor against its respective engaged plate during said maintaining and engaging steps by means of pressure members with a pressure exceeding the pressure generated by the foaming plastic material within the building elements, and individually moving the rollers of the upper conveyor in a vertical direction during the maintaining and compressing steps so that the rollers of the upper conveyor follow dimensional changes of the building elements between the plates and maintain substantially even pressure on the plates.

2. A method as claimed in claim 1 including preheating the frame building elements prior to delivering them into the conveying and compression gap.

3. A method as claimed in claim 1 wherein a separate reinforcement plate, which is not part of the frame building element, is applied to one or both opposite sides of each frame building element during delivery of the frame building element to the conveying and compression gap.

4. A method as claimed in claim 2 wherein a separate reinforcement plate, which is not part of the frame building element, is applied to one or both opposite sides of each frame building element during delivery of the frame building to the conveying and compression gap.

* * * * *